(12) United States Patent
Fisher

(10) Patent No.: US 11,570,851 B2
(45) Date of Patent: Jan. 31, 2023

(54) THERMAL ISOLATION CLAMP

(71) Applicant: Watlow Electric Manufacturing Company, Saint Louis, MO (US)

(72) Inventor: Michael L. Fisher, Leander, TX (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 992 days.

(21) Appl. No.: 16/247,386

(22) Filed: Jan. 14, 2019

(65) Prior Publication Data

US 2019/0350051 A1 Nov. 14, 2019

Related U.S. Application Data

(63) Continuation of application No. 14/585,392, filed on Dec. 30, 2014, now abandoned.

(60) Provisional application No. 61/940,528, filed on Feb. 17, 2014.

(51) Int. Cl.
*H05B 3/06* (2006.01)
*F16L 59/135* (2006.01)
(Continued)

(52) U.S. Cl.
CPC .............. *H05B 3/06* (2013.01); *F16L 59/135* (2013.01); *F16L 59/16* (2013.01); *F16B 2/12* (2013.01);
(Continued)

(58) Field of Classification Search
CPC .......... H05B 3/06; F16L 59/135; F16L 59/16; F16L 3/1091; F16L 3/14; F16L 59/14;
(Continued)

(56) References Cited

U.S. PATENT DOCUMENTS

| | | | | |
|---|---|---|---|---|
| 1,986,357 A | * | 1/1935 | Perry | F16L 25/025 |
| | | | | 285/342 |
| 2,705,158 A | * | 3/1955 | Risley | F16L 41/06 |
| | | | | 248/62 |

(Continued)

FOREIGN PATENT DOCUMENTS

| | | |
|---|---|---|
| JP | 530000782 U1 | 7/1976 |
| JP | 53045279 U1 | 9/1986 |

(Continued)

OTHER PUBLICATIONS

Standard 2 Bolt Pipe Clamp Fig. 712; AAATech.com/hardware/pipe-clamps/712; Oct. 1, 2013; 3 pages.

(Continued)

*Primary Examiner* — Phuong T Nguyen
(74) *Attorney, Agent, or Firm* — Burris Law, PLLC

(57) ABSTRACT

In combination with a pipe (213), a clamp (201) is provided which supports the pipe in a fixed position with respect to a substrate. The clamp includes first (203) and second (205) bands, wherein each of the first and second bands has an arcuate portion (209) and first and second terminal portions (211), and wherein the arcuate portions of the first and second bands are disposed in opposing relation around the surface of the pipe. A first fastener (207) extends through the first terminal portions of the first and second bands, and a second fastener extends through the second terminal portions of the first and second bands. A thermal insulator (233) is disposed between the first fastener and the first terminal portions of the first and second bands, and between the second fastener and the second terminal portions of the first and second bands.

20 Claims, 6 Drawing Sheets

(51) Int. Cl.
*F16L 59/16* (2006.01)
*F16B 2/12* (2006.01)
*F16B 43/00* (2006.01)

(52) U.S. Cl.
CPC ....... *F16B 43/001* (2013.01); *Y10T 29/49826* (2015.01)

(58) Field of Classification Search
CPC .......... F16B 2/12; F16B 43/001; F16B 9/023; Y10T 29/49826
USPC ........................................................ 219/201
See application file for complete search history.

(56) References Cited

U.S. PATENT DOCUMENTS

| | | |
|---|---|---|
| 4,037,810 A | 7/1977 | Pate |
| 5,714,738 A * | 2/1998 | Hauschulz ............... H05B 3/58 |
| | | 219/535 |
| 7,401,819 B2 * | 7/2008 | Gibb ....................... F16L 21/02 |
| | | 285/112 |
| 2008/0272248 A1 | 11/2008 | Pothanikat et al. |
| 2012/0327543 A1 * | 12/2012 | Ellinger ................. H01B 17/26 |
| | | 361/87 |

FOREIGN PATENT DOCUMENTS

| | | |
|---|---|---|
| JP | 11325322 A | 5/1998 |
| KR | 200403757 Y1 | 12/2005 |

OTHER PUBLICATIONS

230kV Aluminum Boiled Bus Supports; Dessert Type CSD-AA; AFLglobal.com; Jan. 12, 2011; 12 pages.
Morris Power Connectors, Oct. 2013; 1 page.
Piping Technology & Products, Inc.; Fig. 60; Heavy Two-Bolt Pipe Clamp; www.pipingtech.com; 1 page.
Pipe Clamps; Southwest LA Industries; swlaind.com/products/pipe-hangers/pipe-clamps; Oct. 1, 2013; 1 page.

* cited by examiner

- PRIOR ART -

- PRIOR ART -

THERMAL ISOLATION CLAMP

CROSS-REFERENCE TO RELATED APPLICATION

This application is a continuation of U.S. Ser. No. 14/585,392, filed Dec. 30, 2014, having the same inventor, and the same title, and which is incorporated herein by reference in its entirety; which claims the benefit of priority from U.S. provisional application No. 61/940,528, filed Feb. 17, 2014, having the same inventor, and the same title, and which is incorporated herein by reference in its entirety.

TECHNICAL FIELD OF THE INVENTION

The present invention pertains generally to pipe clamps, and more particularly to pipe clamps which thermally isolate a pipe from the substrate it is clamped to.

BACKGROUND OF THE INVENTION

Many semiconductor processes, such as chemical vapor deposition (CVD) processes, are implemented in processing chambers that are equipped with various conduits for the inlet and egress of gaseous materials. In such a process, a series of inlet conduits are typically provided for the delivery of a mixture of gases (which may include reactants, precursors and/or the components of the desired atmosphere within the chamber) to the chamber. Similarly, one or more outlet conduits are typically provided to allow reaction byproducts and outflow gases to be exhausted from the chamber.

Each outlet conduit is typically in fluidic communication with a pump, which creates a flow of gas out of the reaction chamber and to an exhaust line for exhaust abatement. The exhaust from a processing chamber is frequently at elevated temperatures, most commonly within the range of 50-180° C. Consequently, large diameter galvanized steel piping is often the material of choice for the exhaust conduit. Redundant exhaust conduit is often provided to allow for routine maintenance on the line without necessitating process shutdown.

Many of the gaseous materials utilized in semiconductor processing, such as tetraethyl orthosilicate (TEOS), boron trichloride ($BCl_3$), aluminum chloride ($AlCl_3$), chlorine trifluoride ($ClF_3$) and dichlorosilane (DCS), are capable of undergoing phase changes between room temperature and the processing temperatures commonly utilized in processing chambers. Consequently, in order to prevent these materials from condensing or liquefying in the foreline (the segment of the outlet conduit between the reaction chamber and the pump), it is important to maintain this portion of the outlet conduit at a temperature similar to that of the processing chamber. This is frequently accomplished by thermally insulating the foreline and/or equipping it with one or more heater elements. For example, Watlow (League City, Tex.) provides a line of heater jackets which consist of an insulating material and a heating element, and which may be utilized for this purpose.

It is typically necessary or desirable to mount the outlet conduit in a semiconductor fabrication plant to a ceiling, wall, floor, or other substrate. Due to the significant weight of the conduit, a mounting rail is commonly used for this purpose, and the conduit is attached to the mounting plate with a series of rigid clamps. Various clamps have been developed in the art for this purpose.

One clamp known to the art is depicted in FIG. 1. The clamp 101 depicted therein, which is available commercially from Tyco Products (Wayne, Mich.) under the trade name UNISTRUT®, comprises a split body 103 with an aperture 105 defined therein through which a pipe (not shown) extends. The body 103 of the clamp 101 includes opposing flanges 107 and a bolt 109 that extends through a threaded aperture provided in each flange 107. As the bolt is tightened, the split body 103 tightens about the pipe, thus holding the clamp rigidly in place. The clamp 101 is further equipped with opposing arms 111 which extend from the base of the clamp 101, and which allow the clamp to be supported from a series of rails or struts that may be affixed to a ceiling, wall, floor, or other suitable substrate.

SUMMARY OF THE INVENTION

In one aspect, and in combination with a pipe, a clamp is provided which supports the pipe in a fixed position with respect to a substrate. The clamp comprises (a) first and second bands, wherein each of said first and second bands has an arcuate portion and first and second terminal portions, and wherein the arcuate portions of said first and second bands are disposed in opposing relation around the surface of said pipe; (b) a first fastener which extends through the first terminal portions of said first and second bands; (c) a second fastener which extends through the second terminal portions of said first and second bands; and (d) a thermal insulator which is disposed between said first fastener and said first terminal portions of said first and second bands, and which is further disposed between said second fastener and said second terminal portions of said first and second bands.

In another aspect, a method is provided for thermally insulating a pipe from a substrate to which the pipe is mounted. The method comprises (a) providing first and second bands, wherein each of said first and second bands has an arcuate portion and first and second terminal portions; (b) providing first and second portions of a thermal insulator; (c) disposing the arcuate portions of said first and second bands in opposing relation around the surface of said pipe; (d) extending a first fastener through the first terminal portions of the first and second bands and through said first portion of said thermal insulator, and into the substrate; and (e) extending a second fastener through the second terminal portions of the first and second bands and through said second portion of said thermal insulator, and into the substrate.

One skilled in the art will appreciate that the various aspects of the present disclosure may be used in various combinations and sub-combinations, and each of those combinations and sub-combinations is to be treated as if specifically set forth herein.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Figure 1:
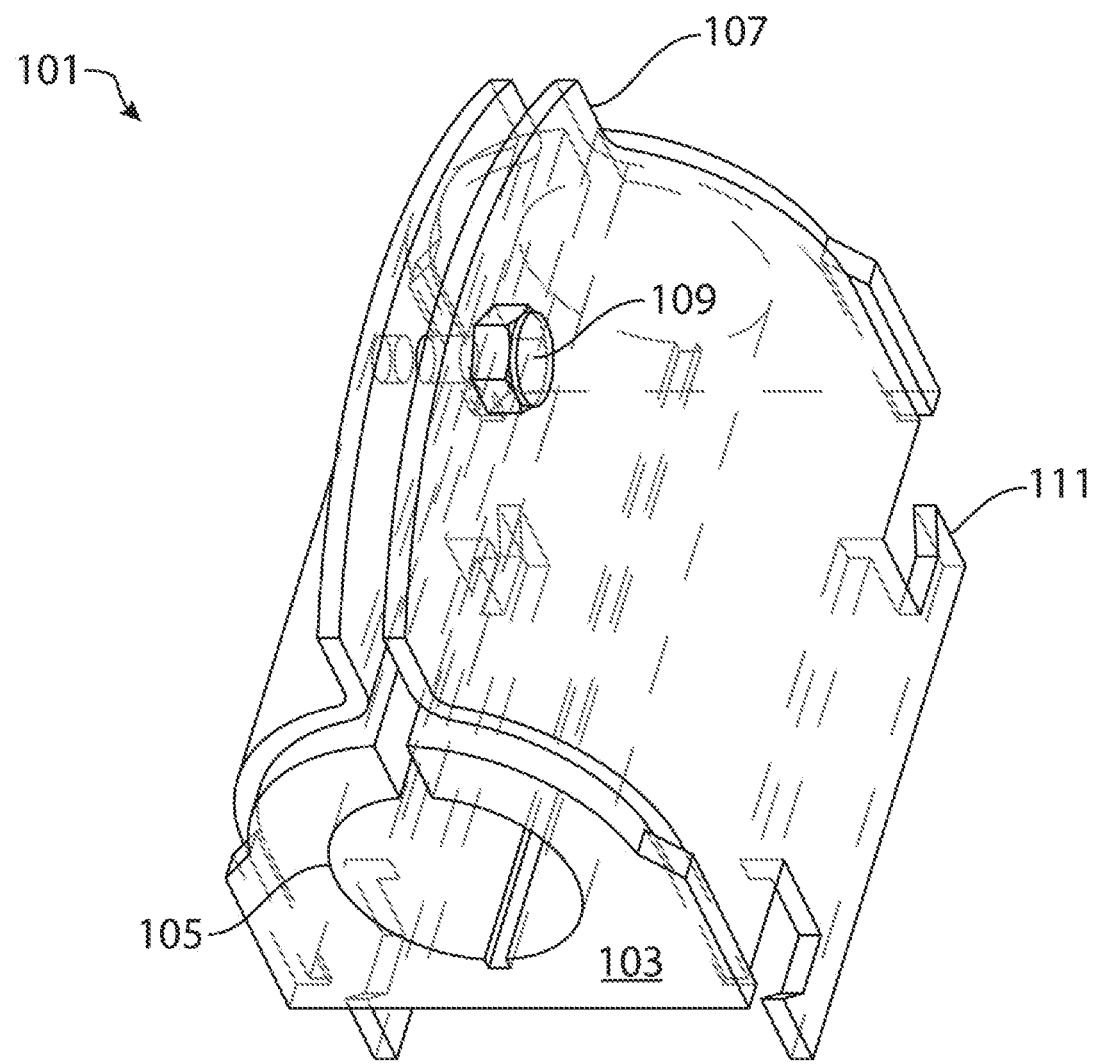
FIG. 1 is an illustration showing a perspective view of a prior art pipe clamp.
Figure 2:
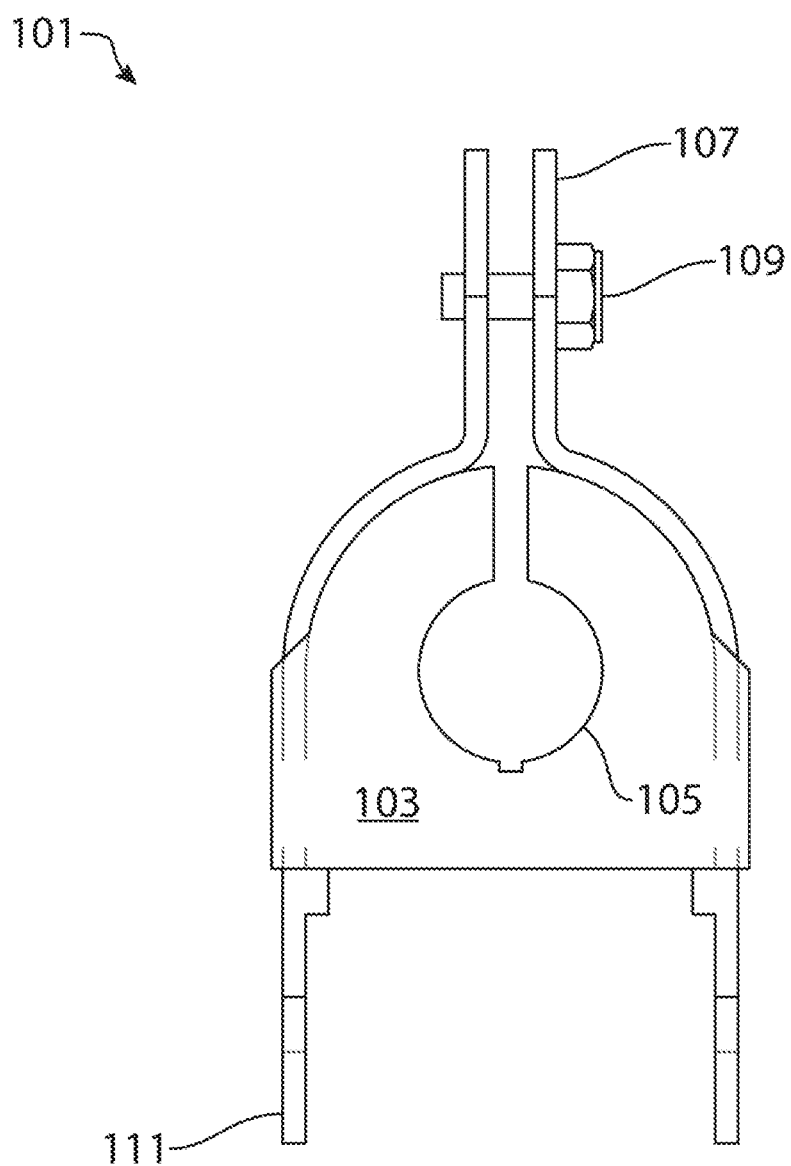
FIG. 2 is a front view of the pipe clamp of FIG. 1.

Despite the provision of thermal insulators and heater elements in forelines of semiconductor processing plants, a significant amount of condensation nonetheless occurs in these conduits. Such condensation may require frequent and expensive maintenance, may result in downtime, and may adversely affect product yields.

It has now been found that the foregoing problem may be attributed, at least in part, to the clamps used to mount the forelines to the mounting rail. In particular, it has been found that the clamps and constituent bolts commonly used for this purpose may act as heat sinks, and may cause the localized precipitation, condensation or undesirable cooling of reactants or reaction byproducts in the pipelines they support.

It has also been found that the foregoing problem may be addressed through the selective use of thermally insulating materials to thermally isolate such clamps and their constituent bolts from the substrate or mounting rail to which they are attached. As a result, the tendency of these clamps (and their constituent bolts) to act as heat sinks is mitigated.

FIGS. 3-6 depict a first particular, non-limiting embodiment of a pipe clamp in accordance with the teachings herein. The pipe clamp 201 depicted therein comprises first 203 and second 205 bands which are arranged in an opposing, spaced apart orientation with respect to each other along the longitudinal axes of first and second fasteners 207. Each of the first 203 and second 205 bands comprises an arcuate portion 209 and first and second terminal portions 211.

Figure 5:
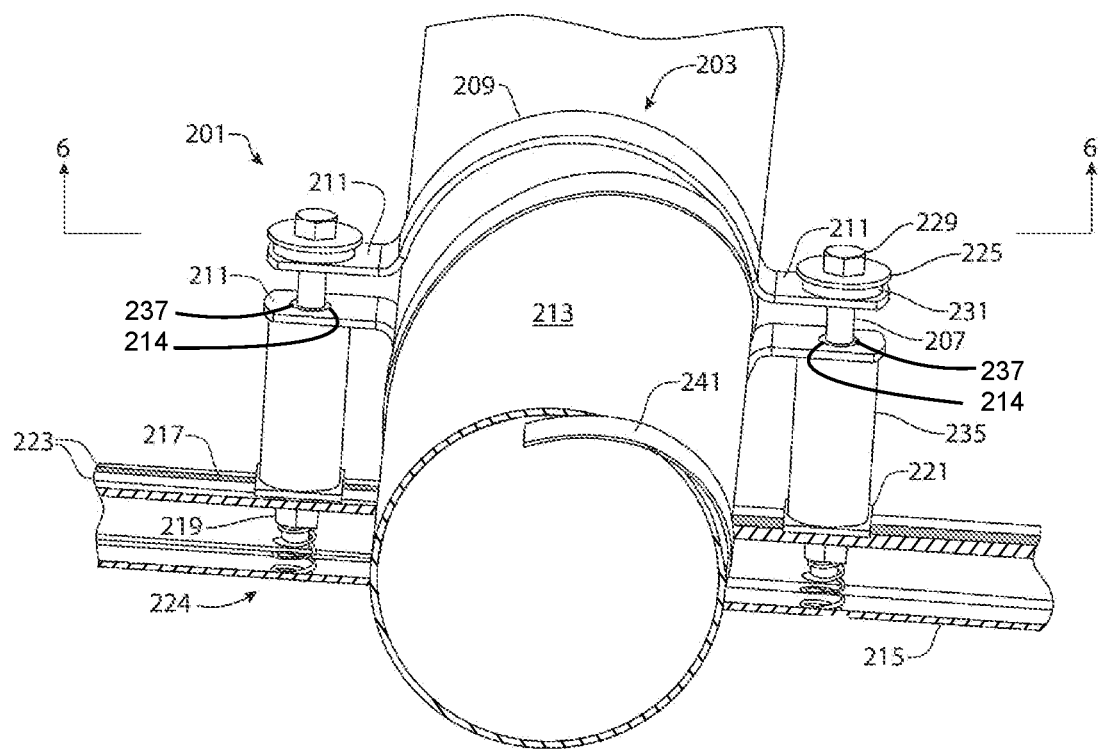
FIG. 5 is a perspective view of the pipe clamp of FIG. 3 shown attached to a pipe.
Figure 6:
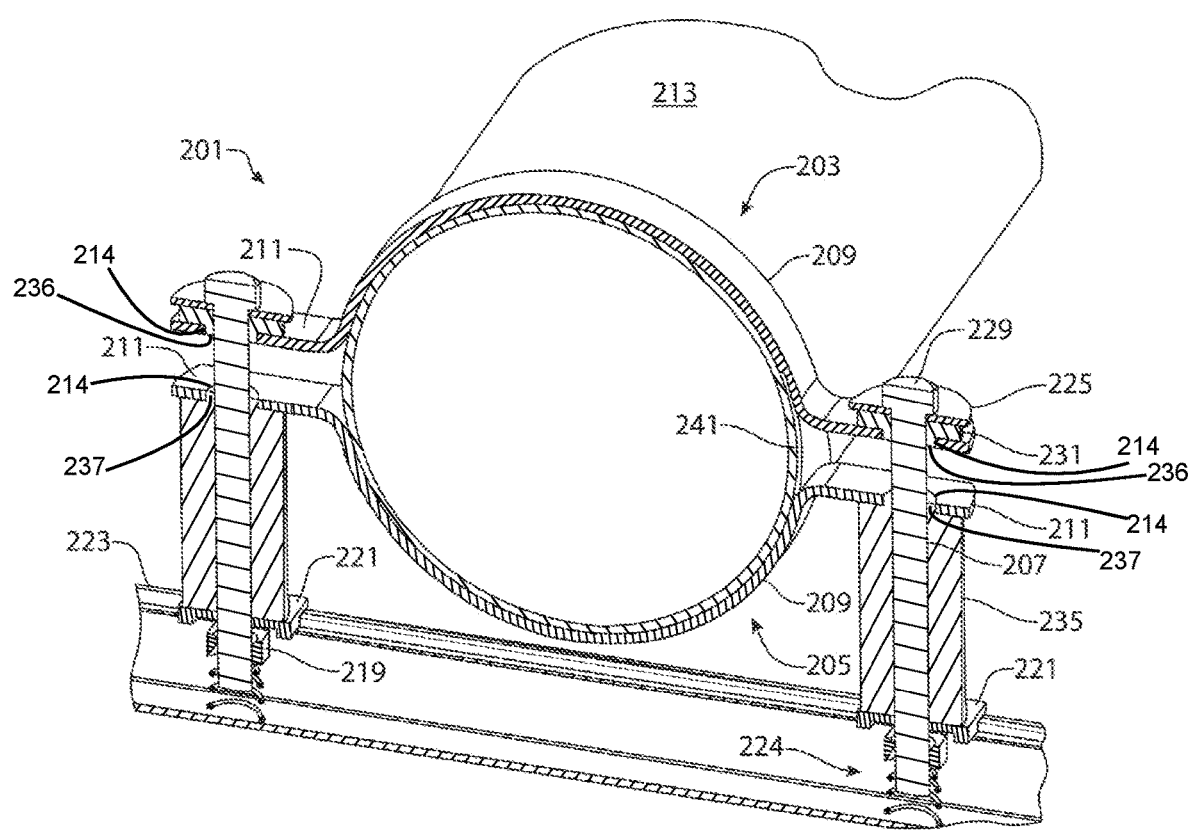
FIG. 6 is a cross-sectional view taken along LINE 5-5 of FIG. 5.

As seen in FIGS. 5-6, the arcuate portions 209 of the first 203 and second 205 bands extend around the surface of a pipe 213 in opposing directions, and the terminal portions 211 are equipped with apertures 214 through which the first and second fasteners 207 extend. With fasteners 207 of the proper length, the clamp 201 allows a pipe 213 to be supported in a fixed position on a ceiling, wall, floor, or other suitable substrate (typically by way of a mounting rail). In the particular embodiment depicted, a rail 215 is provided which may be attached to a substrate. The rail 215 includes a longitudinal slot 217 to which the fasteners 207 may be releasably secured by way of a nut 219 and washer 221 combination which engage the opposing lips 223 (see FIG. 5) of the rail 215.

Figure 3:
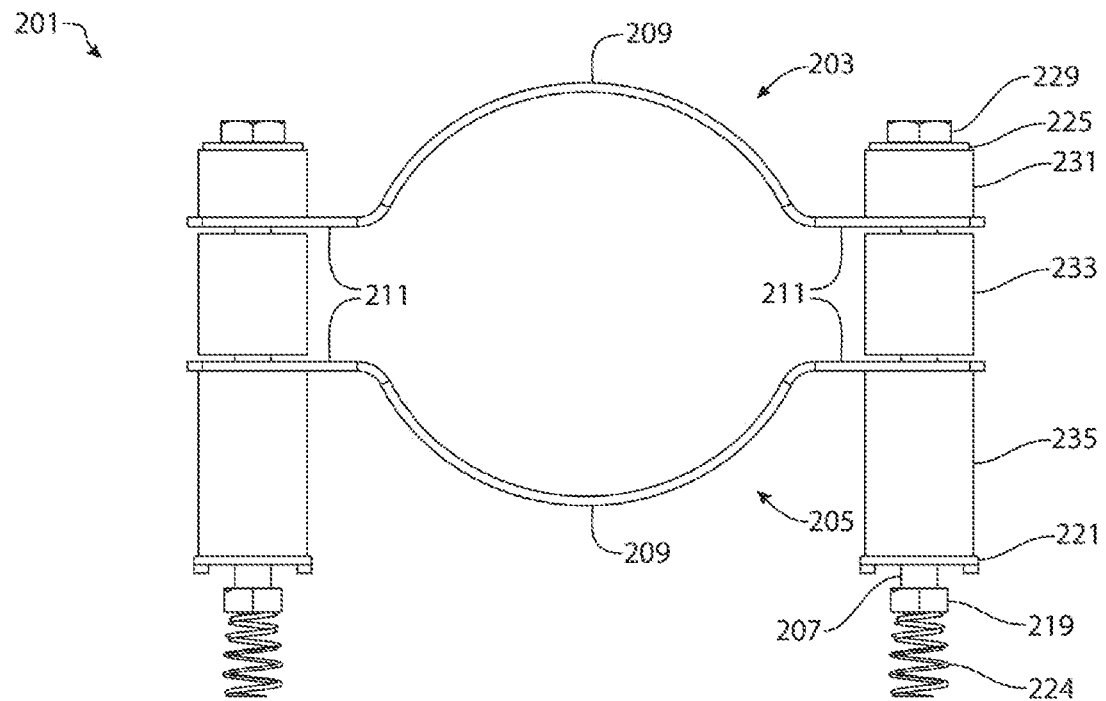
FIG. 3 is a front view of a pipe clamp in accordance with the teachings herein.
Figure 4:
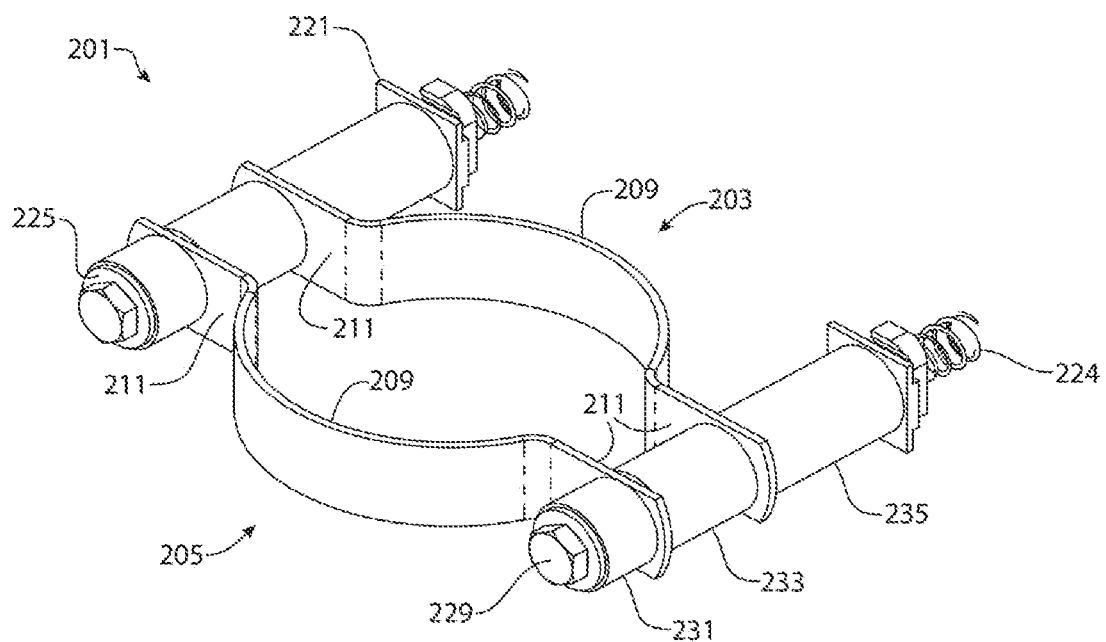
FIG. 4 is a perspective view of the pipe clamp of FIG. 3.

Referring now to FIGS. 3-4, the fasteners 207 are equipped with a (preferably hexagonal) head 229 on a first end thereof, and a threaded portion on the second opposing end thereof which rotatingly engages a nut 219. A first washer 225 is disposed adjacent to the head 219 of the fastener 207. A second washer 221 is disposed adjacent to the substrate 215 (which, in the embodiment depicted, is a mounting rail) such that the substrate 215 is disposed between the second washer 221 and the nut 219. In some embodiments, a spring 224 may be provided to provide a compressive force against the nut 219 so that the fastener 207 may be tightened or loosened by rotating the head 229 with a socket wrench or other suitable tool.

Still referring to FIGS. 3-4, the clamp 201 is also equipped with first 231, second 233 and third 235 portions of a thermally insulating material which are disposed about each fastener 207. Preferably, the thermally insulating material comprises PTFE (polytetrafluoroethylene), due to the excellent heat resistance and thermally insulating properties PTFE possesses. However, other thermally insulating materials may also be utilized including, but not limited, various ceramics, glasses, heat resistant plastics or polymers (including, for example, polystyrene, polyurethane, polyethylene, polybutylene, nitrile rubbers (NBR), ethylene-propylene-diene rubbers (EPDM), and isocyanate/polyol mixtures), and various foams (including both open-cell and closed-cell), mineral wool, glass wool, cellular glass, aerogels, and coatings and fibrous masses constructed from any of the foregoing materials. Some embodiments may incorporate a combination of these materials. For example, in some embodiments, the fasteners and/or clamps may be coated with a PTFE coating and then coated with, or wrapped in, a foamed insulator. In some cases, the insulating material may be mixed with fillers or disposed on a rigid substrate to impart sufficient stiffness to the material so as to create a load-bearing construct.

As best seen in FIGS. 3-4, the first portion 231 of thermally insulating material is disposed between the first washer 225 and the terminal portion 211 of the first band 203. The second portion 233 of thermally insulating material (which is omitted in FIGS. 5-6 for illustrative purposes) is disposed between the terminal portions 211 of the first 203 and second 205 bands. The third portion 235 of thermally insulating material is disposed between the terminal portion 211 of the second band 205 and the second washer 221. Preferably, the thermally insulating material extends through the apertures 214 in the terminal portions 211 of the first 203 and second 205 bands, thus thermally isolating the fastener from the first 203 and second 205 bands. In the example shown in FIGS. 5 and 6, each first portion 231 of thermally insulating material includes an extension 236 that extends into the aperture 214 of the corresponding terminal portion 211 of the first band 203. In the example shown in FIGS. 5 and 6, each third portion 235 of thermally insulating material includes an extension 237 that extends into the aperture 214 of the corresponding terminal portion 211 of the second band 205. Consequently, heat dissipation through the fasteners 207 is reduced or minimized, and the clamp 201 will heat up with the pipe 213 (see FIGS. 5-6) in a relatively uniform manner so that no cold spots are created along the surface of the pipe 213.

As seen in FIG. 5, in the particular embodiment depicted, a thermally conductive strip 241 is wound helically about the exterior surface of the pipe 213. The thermally conductive strip 241 may be utilized to maintain the wall of the pipe 213 at an even temperature. Preferably, the thermally conductive strip 241 is a resistive heater which maintains the pipe 213 at a desired temperature. This helps to prevent condensation within the pipe 213, and also may be useful in maintaining gases or liquids within the pipe within a desired temperature range.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. In combination with a pipe, a clamp which supports said pipe in a fixed position with respect to a substrate, said clamp comprising:
   first and second bands, wherein each of said first and second bands has an arcuate portion and first and second terminal portions, and wherein the arcuate portions of said first and second bands are disposed in opposing relation around a surface of said pipe;
   a first fastener which extends through the first terminal portions of said first and second bands;
   a second fastener which extends through the second terminal portions of said first and second bands; and
   at least one thermal insulator, said at least one thermal insulator being disposed between said first fastener and said first terminal portions of said first and second bands, and further disposed between said second fastener and said second terminal portions of said first and second bands, said at least one thermal insulator extending through apertures in the first and second terminal portions.

2. The combination of claim 1, wherein said at least one thermal insulator is disposed between said substrate and said first terminal portion of said first band, wherein said at least one thermal insulator is disposed between said substrate and said second terminal portion of said first band.

3. The combination of claim 1, wherein each of said first and second fasteners is equipped with a head, and wherein said at least one thermal insulator is disposed between said head of said first fastener and said first terminal portion of said second band, wherein said at least one thermal insulator is disposed between said head of said second fastener and said second terminal portion of said second band.

4. The combination of claim 1, wherein each of said first and second fasteners comprises a shaft, and wherein a first cylindrical portion of said at least one thermal insulator is disposed around the shaft of said first fastener and between the substrate and the first terminal portion of said first band, wherein a second cylindrical portion of said at least one thermal insulator is disposed around the shaft of said second fastener and between the substrate and the second terminal portion of said first band.

5. The combination of claim 1, wherein each of said first and second fasteners comprises a head, and wherein a third cylindrical portion of said at least one thermal insulator is disposed around the shaft of said first fastener and between the head of said first fastener and the first terminal portion of said second band, wherein a fourth cylindrical portion of said at least one thermal insulator is disposed around the shaft of said second fastener and between the head of said second fastener and the second terminal portion of said second band.

6. The combination of claim 1, wherein said first terminal portions of said first and second bands are disposed in an opposing, spaced apart relation to each other, and wherein said second terminal portions of said first and second bands are disposed in an opposing, spaced apart relation to each other.

7. The combination of claim 6, wherein said first fastener is equipped with a shaft which extends through the apertures in each of said first terminal portions of said first and second bands, wherein said second fastener is equipped with a shaft which extends through the apertures in each of said second terminal portions of said first and second bands, wherein a first cylindrical portion of said at least one thermal insulator is disposed around the shaft of said first fastener and between the substrate and the first terminal portion of said first band, and wherein a second cylindrical portion of said at least one thermal insulator is disposed around the shaft of said second fastener and between the substrate and the second terminal portion of said first band, wherein the first cylindrical portion of said at least one thermal insulator extends through the aperture of the first terminal portion of said first band, and wherein the second cylindrical portion of said at least one thermal insulator extends through the aperture of the second terminal portion of said first band.

8. The combination of claim 7, wherein each of said first and second fasteners is equipped with a head, wherein a third cylindrical portion of said at least one thermal insulator is disposed around the shaft of said first fastener and between the head of said first fastener and the first terminal portion of said second band, wherein a fourth cylindrical portion of said at least one thermal insulator is disposed around the shaft of said second fastener and between the head of said second fastener and the second terminal portion of said second band, wherein the third cylindrical portion of said at least one thermal insulator extends through the aperture in the first terminal portion of said second band, and wherein the fourth cylindrical portion of said at least one thermal insulator extends through the aperture in the second terminal portion of said second band.

9. The combination of claim 8, further comprising a first washer disposed about the shaft of said first fastener and a second washer disposed about the shaft of said second fastener, wherein the third cylindrical portion of said at least one thermal insulator is disposed around the shaft of said first fastener and between the first washer and the first terminal portion of said second band, and wherein the fourth cylindrical portion of said at least one thermal insulator is disposed around the shaft of said second fastener and between the second washer and the second terminal portion of said second band.

10. The combination of claim 9, further comprising a third washer disposed about the shaft of said first fastener and a fourth washer disposed about the shaft of said second fastener, wherein said first cylindrical portion of said at least one thermal insulator is disposed between the third washer and the first terminal portion of said first band, and wherein said second cylindrical portion of said at least one thermal insulator is disposed between the fourth washer and the second terminal portion of said first band.

11. The combination of claim 1, wherein said at least one thermal insulator comprises polytetrafluoroethylene (PTFE), and wherein said thermal insulator is not disposed on the surface of said pipe.

12. The combination of claim 1, wherein said clamp supports said pipe in a fixed, spaced apart relation to said substrate.

13. The combination of claim 1, wherein said pipe is equipped with a heating strip which heats the surface of said pipe, and wherein said heating strip is helically wound about the surface of said pipe.

14. A clamp for supporting a pipe with respect to a substrate, the clamp comprising:
   first and second bands, wherein each of the first and second bands has a holding portion and first and second terminal portions, wherein the holding portions of the first and second bands are configured to engage a surface of the pipe, and wherein each first terminal portion defines a first aperture and each second terminal portion defines a second aperture;
   a first fastener extending through the first aperture of the first terminal portion of the first band and through the first aperture of the first terminal portion of the second band;
   a second fastener extending through the second aperture of the second terminal portion of the first band and through the second aperture of the second terminal portion of the second band; and
   at least one thermal insulator, wherein the at least one thermal insulator is disposed between the first fastener and the first terminal portions of the first and second bands such that the at least one thermal insulator inhibits contact between the first fastener and the first terminal portions of the first and second bands, and wherein the at least one thermal insulator is disposed between the second fastener and the second terminal portions of the first and second bands such that the at least one thermal insulator inhibits contact between the second fastener and the second terminal portions of the first and second bands.

15. The clamp according to claim 14 further comprising:
   a first washer and a second washer; and
   a first nut and a second nut,
   wherein the first fastener includes a head and a shaft, the shaft of the first fastener extending through the first aperture of the first terminal portion of the first band, through the first aperture of the first terminal portion of the second band, and through the first washer, wherein the first nut is threadably engaged with the shaft of the first fastener,
   wherein the second fastener includes a head and a shaft, the shaft of the second fastener extending through the second aperture of the second terminal portion of the first band, through the second aperture of the second terminal portion of the second band, and through the second washer, wherein the second nut is threadably engaged with the shaft of the second fastener,
   wherein the at least one thermal insulator is disposed between the first terminal portion of the second band and the first washer such that the at least one thermal insulator inhibits contact between the first terminal portion of the second band and the first washer, and
   wherein the at least one thermal insulator is disposed between the second terminal portion of the second band and the second washer such that the at least one thermal insulator inhibits contact between the second terminal portion of the second band and the second washer.

16. The clamp according to claim 15,
   wherein the substrate includes a pair of opposing lips that define a longitudinal slot and the first and second washers are configured to engage the opposing lips,
   wherein first fastener and the first nut are arranged such that one of the head of the first fastener and the first nut is configured to sandwich the opposing lips between the first washer and the one of the head of the first fastener and the first nut, and
   wherein the second fastener and the second nut are arranged such that one of the head of the second fastener and the second nut is configured to sandwich the opposing lips between the second washer and the one of the head of the second fastener and the second nut.

17. The clamp according to claim 16 further comprising:
   a first spring that biases the one of the head of the first fastener and the first nut toward the first washer; and
   a second spring that biases the one of the head of the second fastener and the second nut toward the second washer.

18. The clamp according to claim 15, wherein the at least one thermal insulator comprises at least one of polytetrafluoroethylene (PTFE), ceramic, glass, polystyrene, polyurethane, polyethylene, polybutylene, isocyanate/polyol mixtures, foam, mineral wool, glass wool, cellular glass, and aerogel, and wherein the at least one thermal insulator does not contact a surface of the pipe.

19. The clamp according to claim 15,
   wherein the at least one thermal insulator includes a first portion, a second portion, a third portion, and a fourth portion,
   wherein the first, second, third, and fourth portions are discrete from one another,
   wherein the first portion is disposed between the head of the first fastener and the first terminal portion of the first band to inhibit contact therebetween,
   wherein the second portion is disposed between the first washer and the first terminal portion of the second band to inhibit contact therebetween,
   wherein the third portion is disposed between the head of the second fastener and the second terminal portion of the first band to inhibit contact therebetween, and
   wherein the fourth portion is disposed between the second washer and the second terminal portion of the second band to inhibit contact therebetween.

20. The clamp according to claim 19,
   wherein the at least one thermal insulator further includes a fifth portion and a sixth portion,
   wherein the first, second, third, fourth, fifth, and sixth portions are discrete from one another,
   wherein the fifth portion is disposed between first terminal portion of the first band and the first terminal portion of the second band,
   wherein the sixth portion is disposed between the second terminal portion of the first band and the second terminal portion of the second band,
   wherein at least one of the first portion and the fifth portion extends into the first aperture of the first terminal portion of the first band, wherein at least one of the second portion and the fifth portion extends into the first aperture of the first terminal portion of the second band, wherein at least one of the third portion and the sixth portion extends into the second aperture of the second terminal portion of the first band, and wherein at least one of the fourth portion and the sixth portion extends into the second aperture of the second terminal portion of the second band.

* * * * *